United States Patent [19]
Cooper

[11] 4,305,091
[45] Dec. 8, 1981

[54] ELECTRONIC NOISE REDUCING APPARATUS AND METHOD

[76] Inventor: J. Carl Cooper, 1101 Continentals Way #109, Belmont, Calif. 94002

[21] Appl. No.: 30,288

[22] Filed: Apr. 16, 1979

Related U.S. Application Data

[63] Continuation-in-part of Ser. No. 763,904, Jan. 31, 1977, abandoned.

[51] Int. Cl.³ .................. H04N 9/535; H04N 5/21; H04B 15/00
[52] U.S. Cl. .................. 358/36; 358/167; 328/165
[58] Field of Search ............ 358/36, 167, 37, 31, 358/166; 328/165, 167; 455/303, 304, 307, 311, 312; 364/515

[56] References Cited

U.S. PATENT DOCUMENTS

| | | | |
|---|---|---|---|
| 3,009,016 | 11/1961 | Graham | 358/167 |
| 3,700,812 | 10/1972 | Springett | 325/473 |
| 3,875,584 | 4/1975 | Fletcher et al. | 358/36 |
| 3,995,108 | 11/1976 | Morrison | 358/162 |
| 4,009,334 | 2/1977 | Sypula | 358/36 |
| 4,058,836 | 11/1977 | Drewery et al. | 358/167 |
| 4,064,530 | 12/1977 | Kaiser | 358/36 |
| 4,072,984 | 2/1978 | Kaiser | 358/31 |

Primary Examiner—John C. Martin
Attorney, Agent, or Firm—Woodling, Krost & Rust

[57] ABSTRACT

The present disclosure teaches a method and apparatus for reducing noise in an electronic signal. These inventive conceptions include a means for delaying the electronic signal and a comparison means for comparing the delayed signal to the signal in its undelayed condition. Means are provided for processing the signal in response to the comparison means to remove at least part of the noise.

30 Claims, 28 Drawing Figures

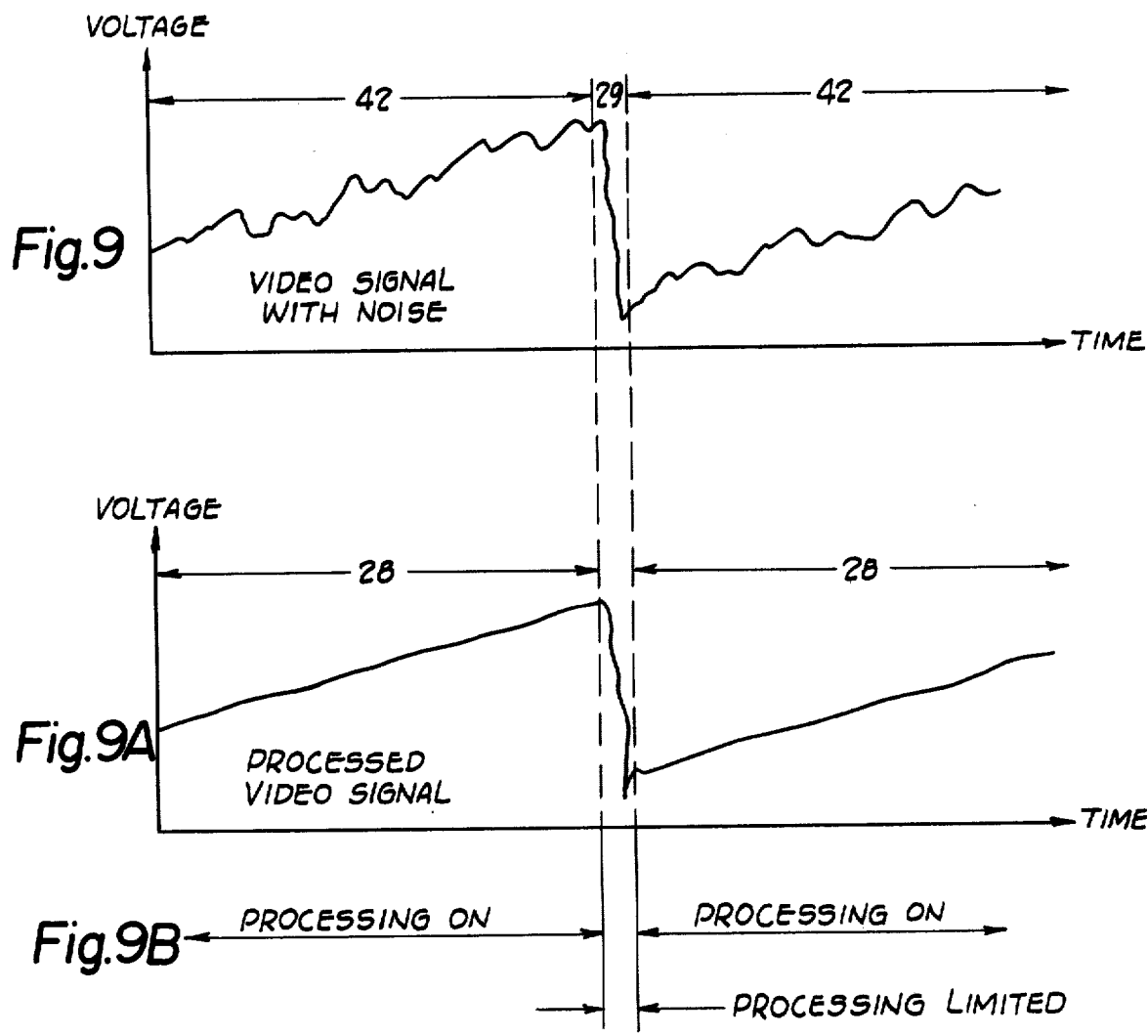
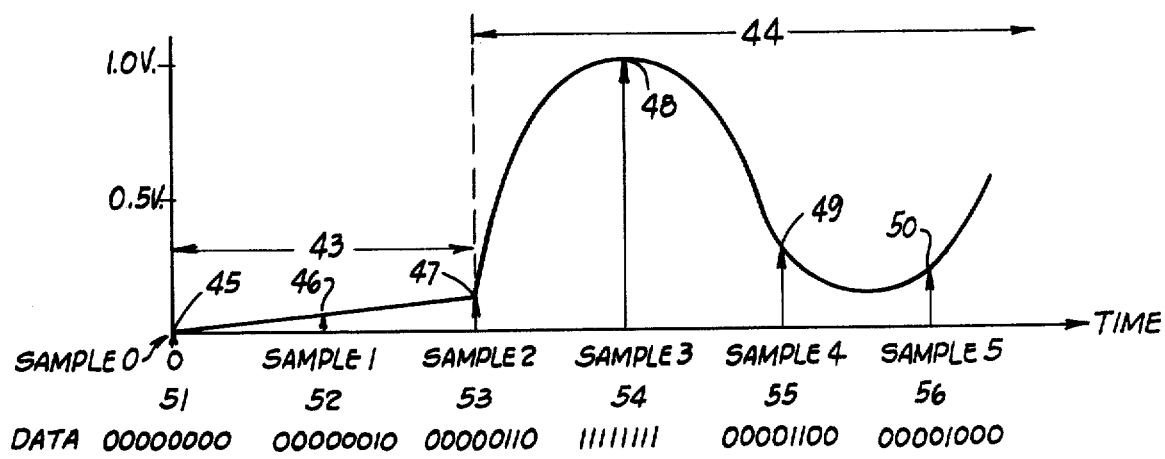
Fig. 10

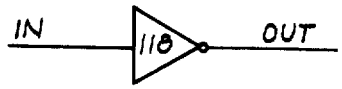

7404 INVERTER

INPUT IS INVERTED AND APPEARS AT THE OUTPUT.

Fig. 17

7400 NAND

Fig. 18

OUTPUT OBEYS THE FOLLOWING TRUTH TABLE.

| A | B | OUT |
|---|---|-----|
| 0 | 0 | 1 |
| 0 | 1 | 1 |
| 1 | 0 | 1 |
| 1 | 1 | 0 |

IF LINE A IS HIGH THE OUTPUT BECOMES LINE B INVERTED

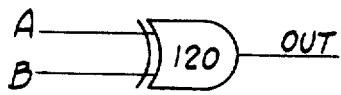

7486 EXCLUSIVE OR

Fig. 19

OUTPUT OBEYS THE FOLLOWING TRUTH TABLE.

| A | B | OUT |
|---|---|-----|
| 0 | 0 | 0 |
| 0 | 1 | 1 |
| 1 | 0 | 1 |
| 1 | 1 | 0 |

IF A IS LOW THE OUTPUT IS THE SAME AS B. IF A IS HIGH THE OUTPUT IS OPPOSITE OF B (AN INVERTER THAT CAN BE BYPASSED).

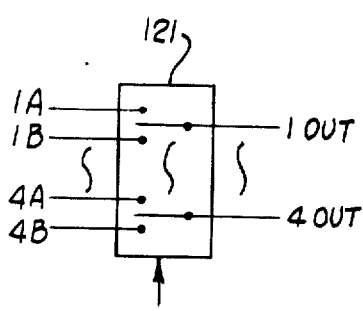

SELECT
74157 LINE SELECT

AN ELECTRONIC 4 DOUBLE THROW SWITCH CONTROLLED BY A SELECT INPUT. THE OUTPUT IS SWITCHED TO ONE OR THE OTHER INPUT BY THE SELECT LINE.

Fig. 20

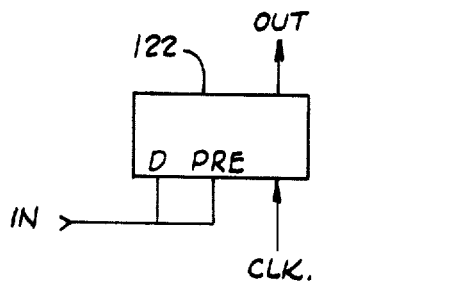

7474 D TYPE FLIP FLOP

FUNCTIONAL BLOCK

USED TO PASS ANY LOW SIGNAL FROM INPUT TO OUTPUT IMMEDIATELY. DELAYS ANY HI INPUT UNTIL CLK. CHANGES FROM LOW TO HI.

Fig. 21

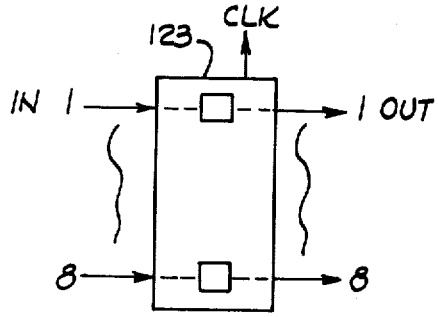

74198 SHIFT REGISTER

STORES WHAT IS PRESENT AT INPUT AND MAINTAINS THAT DATA AT OUTPUT. STORAGE TAKES PLACE WHEN CLK GOES FROM LOW TO HI AND OUTPUT WILL REMAIN THE SAME EVEN IF INPUT IS REMOVED.

Fig. 22

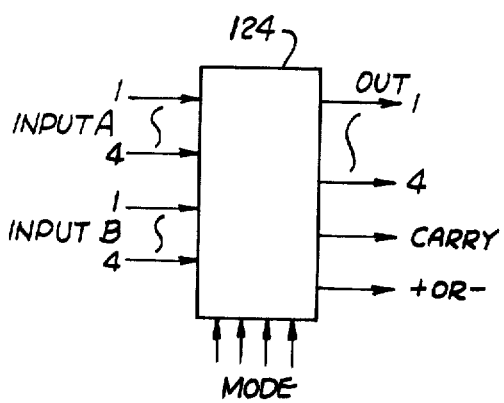

74181 ARITHMETIC LOGIC UNIT

A.L.U. PREFORMS ADDITION, SUBTRACTION, ETC. ON 2,4 BIT BINARY NUMBERS- FUNCTION (ADD, SUB., ETC.) IS CONTROLLED BY 4 MODE CONTROL LINES. A CARRY OUTPUT IS PROVIDED AND UNITS MAY BE CASCADED TO COMPUTE NUMBERS LARGER THAN 4 BITS. IN SUBTRACTION THE CARRY OUTPUT INDICATES WHETHER THE OUTPUT IS INVERTED OR NORMAL. EXTERNAL INVERTERS (7486) MUST BE SWITCHED IN OR OUT IN ORDER TO CORRECT THE INVERSION, AN EXTRA OUTPUT TELLS WHETHER THE DIFFERENCE IS + OR - (TELLS WHETHER A > B).

Fig. 23

ELECTRONIC NOISE REDUCING APPARATUS AND METHOD

This application is a continuation in part of my U.S. Pat. Application Ser. No. 763,904 filed Jan. 31, 1977 entitled "Electronic Noise Reducing Apparatus And Method", now abandoned.

Electronic Noise is a physical property which is at times most troublesome to electronic circuitry. In practical applications, unwanted noise is added or increased in a wanted electronic signal every time that signal passes through any resistance. Since all electronic devices contain some resistance, they are noise producers, and when amplification is added to these devices, the noise is amplified along with the wanted signals. While it is possible to design electronic circuitry to minimize the effects of noise on the wanted electronic signal, it is impossible to completely eliminate these effects. As the wanted signal passes through more and more stages of circuitry, the unwanted noise will always increase, i.e. the signal to noise ratio (S/N) will decrease until at some point, no matter how well designed the circuitry, the signal will become unacceptable because of the noise. In order to improve on this situation, it is obvious that the noise on the electronic signal must be removed at some stage in order to prevent the eventual destruction of the signal. In order to demonstrate the problem and its solution, I have selected television video signals.

Other objects and a fuller understanding of this invention may be had by referring to the following description and claims, taken in conjunction with the accompanying drawings, in which:

FIG. 9 is a graph of a typical video signal 42 with detail 29 with said signal and detail having noise impressed on them;

FIG. 9A is a graph of a typical video signal as in FIG. 9 with noise removed from signal areas 28 which do not contain detail;

FIG. 9B is an indication of time durations during which processing is turned on, and limited, in noise removal circuitry. Note that FIGS. 9, 9A and 9B share a common time axis;

FIG. 10 is a graph of a typical signal containing a linear ramp 43 and a sinusoid wave 44, including typical sample points in sequence 45-50 used by an A-D converter and 8 bit binary data words 51-56 which are the output of the A-D which correspond to the voltage of the analog signal at the sample points 45-50 in sequence.

Figure 11:
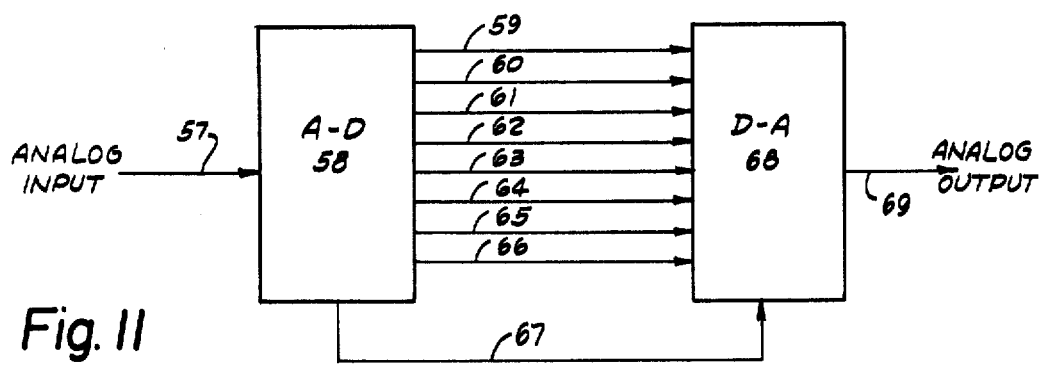
Figure 12:

FIG. 11 is a block diagram of a typical 8 binary bit analog to digital to analog conversion set. The set is composed of an input 57 for the analog signal which is to be converted, the analog to digital converter 58, the output of the A-D comprised of 8 binary data lines 59-66 inclusive, the clock output 67, the digital to analog (D-A) converter 68, which converts the series of digital data words on lines 59-66, utilizing the clock on line 67, to an analog circuit 69. The analog output 69 will correspoond to the analog input 57 if the digital data on lines 59-66 is not changed or modified;

FIG. 12 is a block diagram of a typical digital noise reducer unit which utilizes an A-D, D-A conversion set for ease of operation. The reducer is composed of analog input 70 which corresponds to 57. FIG. 11, data lines and clock line 72 which correspond to 59-67 of FIG. 11, the actual noise reduction circuitry 73, data and clock outputs 74 from the noise reduction circuitry, similar to 59-67 of FIG. 11, D-A unit 75, which corresponds to 68 of FIG. 11, and analog output 76 which corresponds to 69 of FIG. 11.

Figure 13:
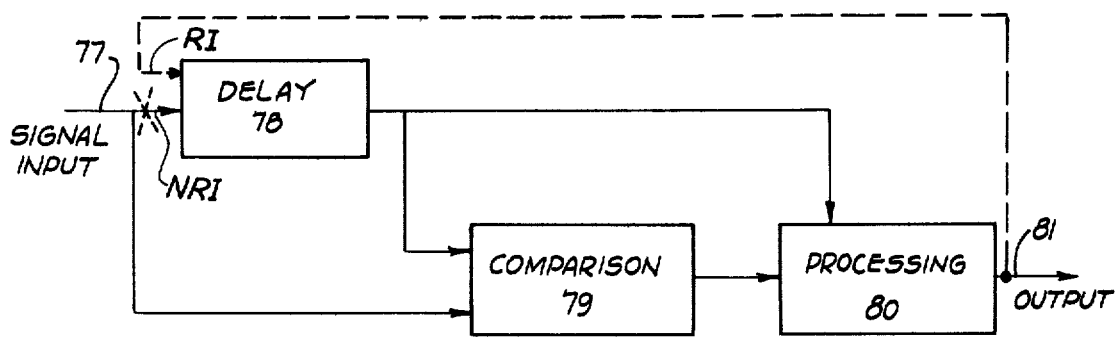

FIG. 13 is a block diagram of noise reduction unit with the circuit input 77, the data delay block 78, the comparison block 79, the processing block 80 and the circuit output 81. Dashed line RI indicates the recursive input connection and NRI the nonrecursive connection for the delay block 78. For a nonrecursive system NRI is connected and RI is removed. For a recursive system NRI is disconnected and RI is connected.

Figure 14:
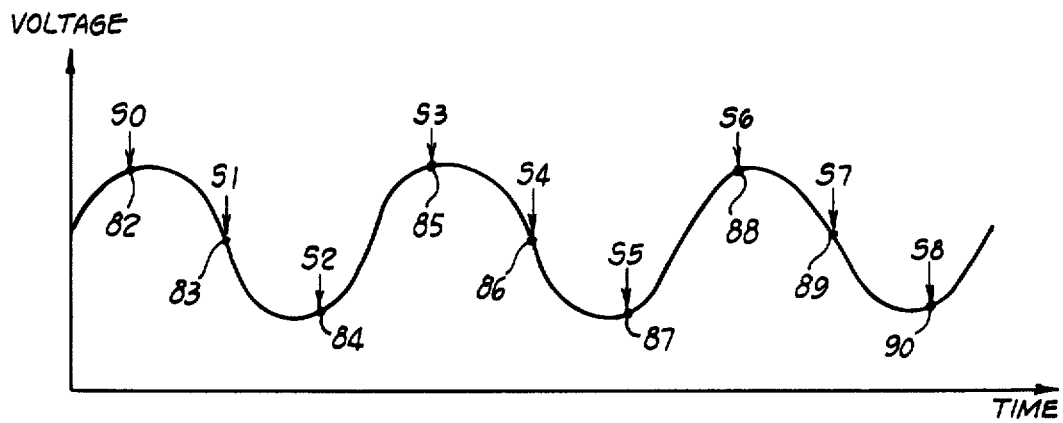
Figure 15:
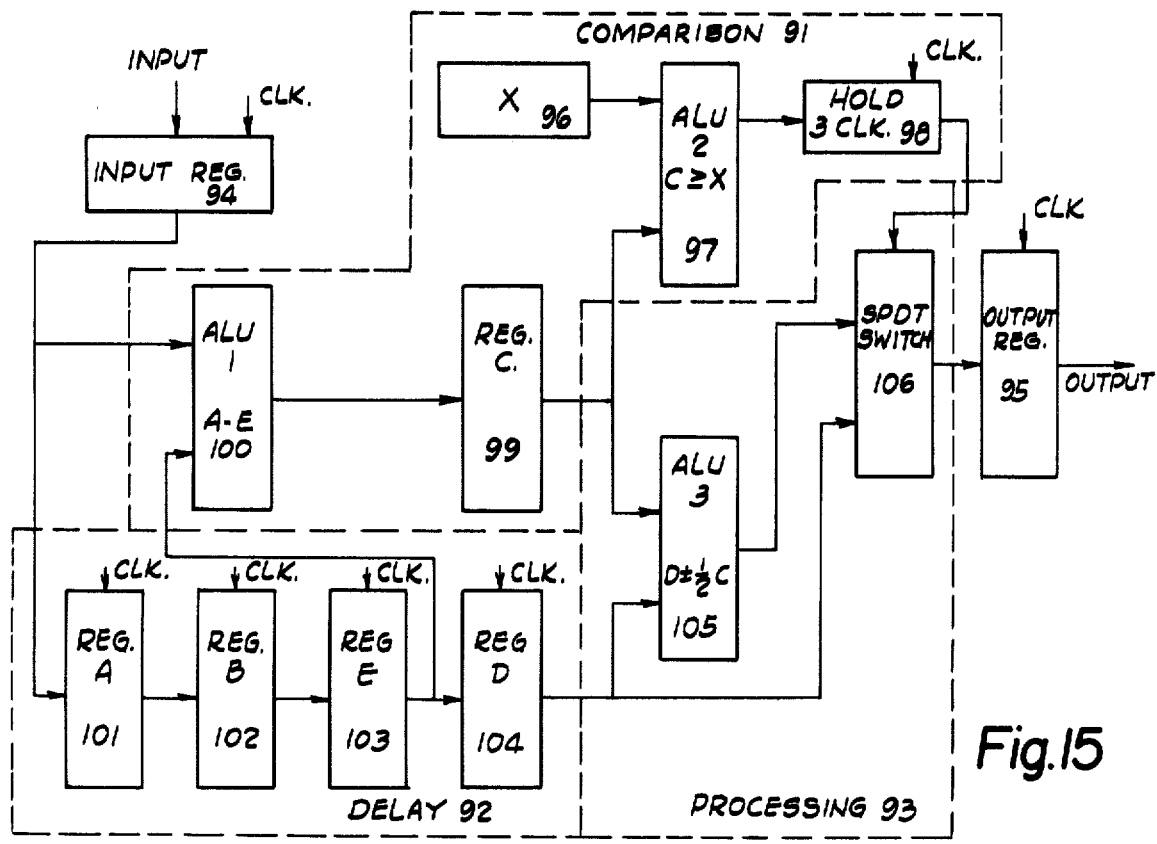

FIG. 14 is a graph of a typical sinusoidal color subcarrier such as that in the National Television Standards Committee (NTSC) Color Television System, with A-D sample points 50-58 labeled 82-90 respectively;

FIG. 15 is a block diagram of prototype noise reduction unit having components grouped into 3 blocks, comparison block 91, including components 96, 97, 98, 99, 100, delay block 92 including components 101, 102, 103, 104, processing block 93 including components 105, 106, and output register 95 and input register 94 shown for clarity. Parts listed are:

Number 96 identifies a binary number also known as the detail threshold, which may be set by a series of switches.

Number 97 identifies an arithmetic logic unit similar to that in FIG. 23 set to determine if one input number is larger than another.

Number 98 identifies a storage circuit for the output of 97, having a storage time 3 clock pulses, similar to that described in FIG. 21.

Number 99 identifies a shift register for the output of 100 similar to that in FIG. 22.

Number 100 identifies an arithmetic logic unit, set to subtract one number from another similar to that described in FIG. 23.

Numbers 101-104 identify shift registers similar to that described in FIG. 22.

Number 105 identifies an arithmetic logic unit set to add or subtract two numbers depending on a command from one of its inputs, similar to that described in FIG. 23.

Number 106 identifies an eight pole double throw electronic switch also known as a line selector similar to that described in FIG. 20.

Figure 16:
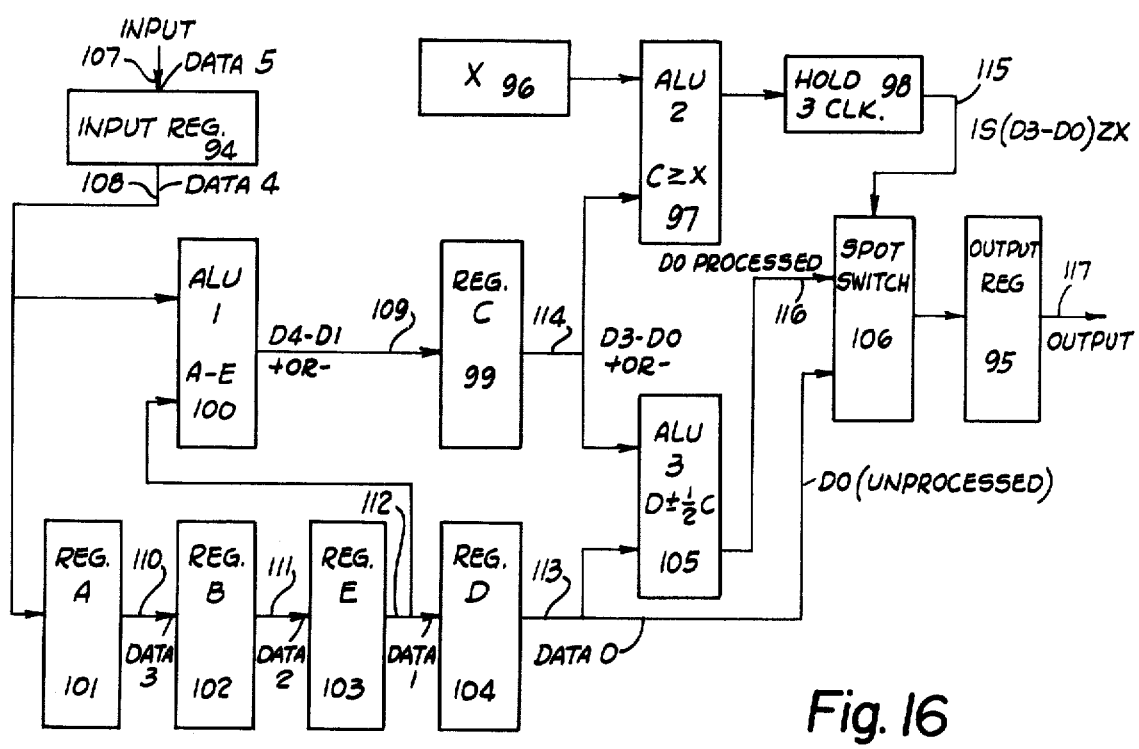
Figure 24:
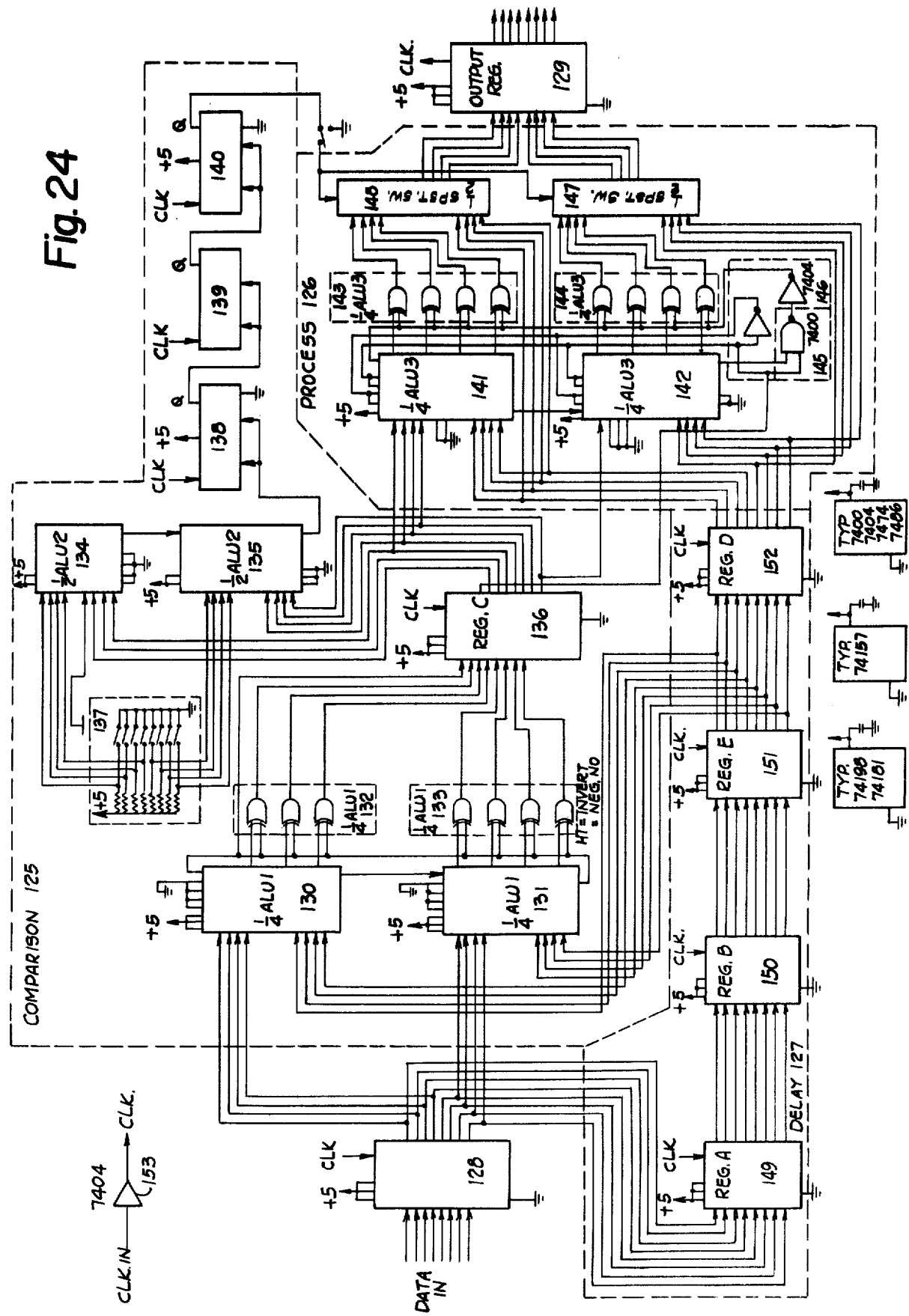

FIG. 16 is the same block diagram as FIG. 15, showing the location of data words and internal calculations, at points 107–117, in a specific example;

FIG. 17 is a schematic symbol for a digital inverter 118 and an explanation of its function. For further details consult manufacturers information for a type 7404 Integrated Circuit (I.C.);

FIG. 18 is a schematic symbol 119 for a digital Nand gate and an explanation of its function. For further details consult manufacturers information for a type 7400 I.C.;

FIG. 19 is a schematic symbol 120 for a digital exclusive or gate with a brief explanation of its function. For further detail consult manufacturers information for a type 7486 I.C.;

FIG. 20 is a schematic symbol 121 for a digital line selector with a brief explanation of its function. For further details consult manufacturers information for a type 74157 I.C.;

FIG. 21 is a schematic symbol 122 for a digital D type flip flop with a brief explanation of its use. For further details consult manufacturers information for a type 7474 I.C.;

FIG. 22 is a schematic diagram 123 for a digital shift register (SR) with a brief explanation of its function. For further details refer to manufacturers specifications for a type 74198 I.C.;

FIG. 23 is a schematic diagram 124 for a digital arithmetic logic unit (ALU) with a brief explanation of its function. For further details refer to manufacturers specifications for a type 74181 I.C.;

FIG. 24 is a schematic diagram for prototype noise reduction circuit composed of comparison block 125 including ALU-1 130, 131, 132, 133, register C 136, ALU-2, 134, 135, number set switches 137, 3 clock delay 138, 139, 140 process block 126 composed of ALU-3 141, 142, 143, 144, 145, 146, and SPST switch 147, 148, delay block 127, composed of shift registers 149, 150, 151, 152, input register 128 and output register 129, and clock inverter 153. Components are:

Numbers 128, 136, 129, 149, 150, 151, 152 identify a 74198 shift register. See FIG. 22.

Numbers 130, 131, 134, 135, 141, 142 identify a 74181 ALU. See FIG. 23.

Numbers 153, 146 identify an inverter. See FIG. 17.

Numbers 132, 133, 143, 144 identify an Exclusive Or. See FIG. 19.

Numbers 147, 148 identify an SPST switch. See FIG. 20.

Number 145 identifies a NAND gate. See FIG. 18.

Numbers 138, 139, 140 identify a flip flop. See FIG. 21.

Figure 25:
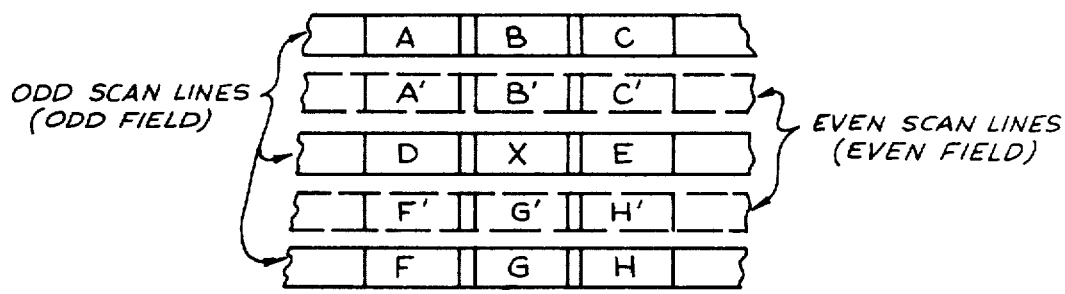
Figure 26:
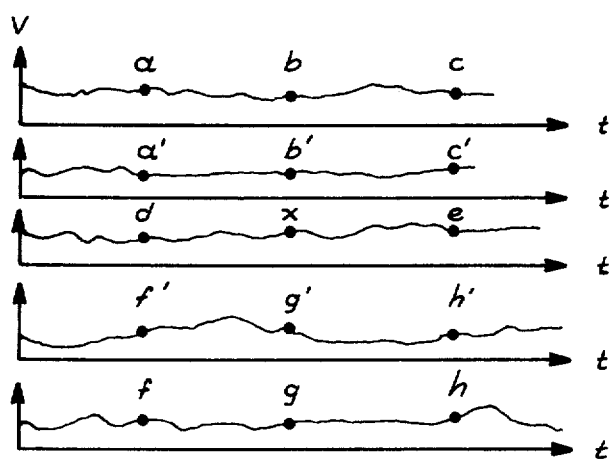

FIG. 25 is a representation of five scan lines taken at any point in a television raster and as viewed on a television CRT; and FIG. 26 is a representation of the video waveforms which correspond to the scan lines of FIG. 25.

NOISE ESSAY

A study of noise which is prevalent in a video signal is necessary before one may attempt to reduce this noise. A great many engineers have devoted much time to the design of low noise circuitry in television cameras, video tape recorders, and video processing equipment; however, relatively few engineers have devoted their work to removing noise which has already been generated. It is believed that this lack of attention is primarily due to the common belief that once noise is generated, it cannot be removed, except by bandwidth limiting, which in its simple form eliminates or reduces resolution or detail. The present invention has come about after an in depth study and analysis of noise in video and audio signals over the past several years utilizing several different approaches. Among the methods used are spectrum analysis, waveform analysis, vector analysis (for phase encoded color signals) and observation of CRT displays. Most observations confirm the standard noise models which are discussed by Motchenbacher and Fitchen in their book *Low Noise Electronic Design.* Observation of noise on a video waveform which has been recorded, and replayed in a frozen time mode reveals a property of noise in the detail in that signal that is not commonly known. This property will be discussed later.

A steady state D.C. signal is shown in FIGS. 1, 2, 7 and 8 of the drawings, which exhibit normal noise, in white and 1/f domains. Bandwidth reduction will effectively decrese this noise, and if the reduction is severe enough, the noise will be virtually eliminated. See *Low Noise Electronic Design* for further details.

Figure 1:
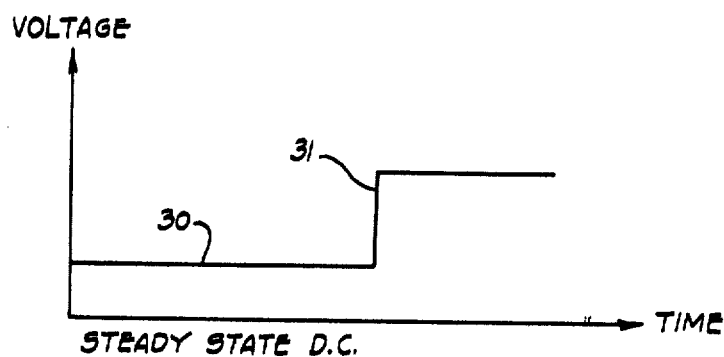
FIG. 1 is a typical steady state D.C. electronic signal graph with detail 31.
Figure 2:
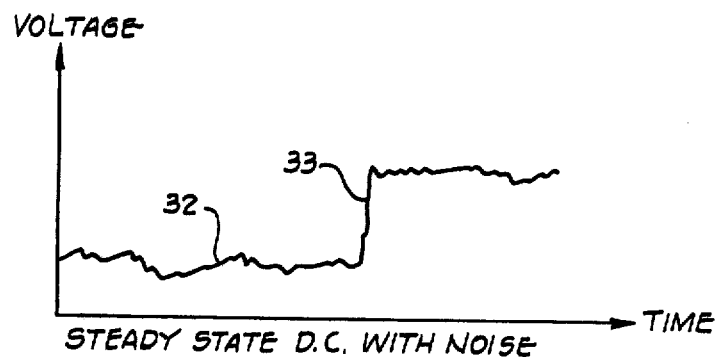
FIG. 2 is a typical steady state D.C. signal 32 with detail 33 as in FIG. 1, after noise has been impressed on said signal and detail.
Figure 3:
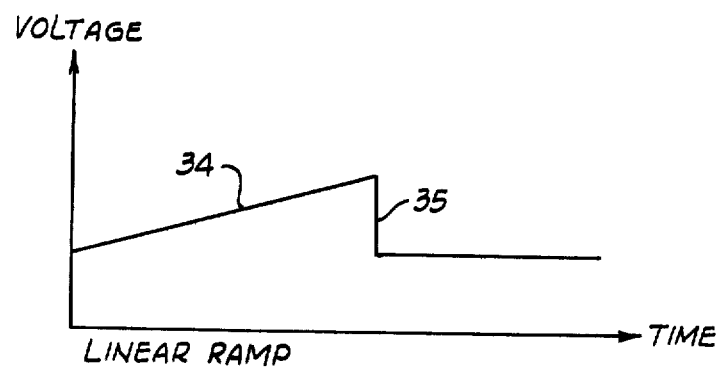
FIG. 3 is a typical electronic linear ramp signal 34 with detail 35.

Noise on a linear or approximately linear ramp can be treated approximately the same as that of a steady state D.C. signal, except that bandwidth limiting cannot be as severe since it is necessary to pass the D.C. shift. See FIGS. 3 and 4. Noise anaylsis of a sine wave is somewhat more complex. See FIGS. 5 and 6. Most high frequency noise (primarily white and popcorn noise) can be effectively removed by band limiting above the frequency of the signal sine wave; however, 1/f noise can be especially troublesome in this mode. If the bandwidth is lowered further to suppress 1/f noise, then the signal will also be suppressed. Since color information in a National Television Standards Committee (NTSC) video signal is a sine wave which is phase and amplitude modulated, variations will be subjectively observed as color hue and saturation variations. These variations are very annoying to most observers; therefore, it is especially critical to preserve this sine wave formation. The mechanism for reducing noise on this signal must therefore be an averaging process, coupled with a band limiting process. The average would sample the sine wave in different spots, compute an average amplitude and phase and then correct the sine wave to these average values. Bandwidth limiting would reduce noise above the frequency of the sine wave. The averaging process also works well on low frequency noise and linear ramp signals, which could be treated as sinusoidal waves having no sinusoidal amplitude.

Analysis of recorded noise reveals that the subjective or visual noise in the color subcarrier is primarily dominated by noise of those frequencies near and far below subcarrier. The noise above subcarrier frequency is not seen as color noise because of the band pass effects of all state-of-the art color demodulators; this high frequency noise is observed as luminance noise. This luminance noise (with the color subcarrier spectrum removed) appears to be the same as the linear ramp noise of FIG. 4 and may be removed by band limiting or averaging.

For video signals, analysis and observation of all three signal cases in FIGS. 1–6 reveals that noise is visually most noticeable on low bandwidth portions (horizontal waveform portions of a video signal). This implies once again the an averaging process is needed to remove the noise, since averaging works better than bandlimiting at low frequencies.

Figure 6:
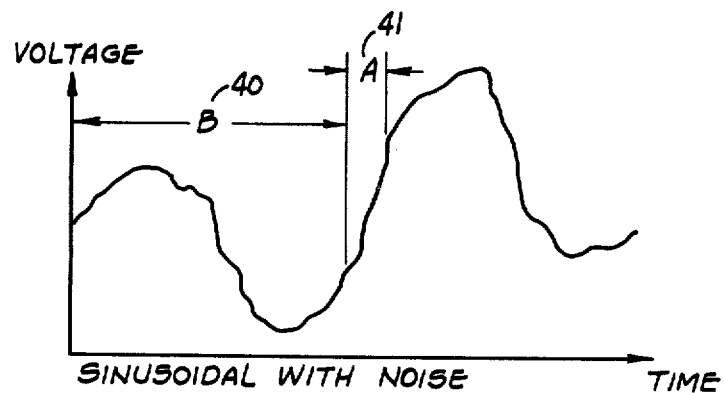
FIG. 6 is a typical sinusoidal electronic signal 40 with detail 41 as in FIG. 5 after noise has been impressed on said signal and detail.
Figure 7:
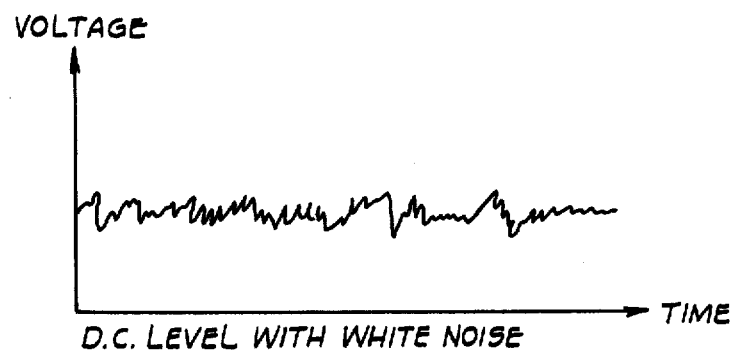
FIG. 7 is a typical D.C. electronic signal with noise of even power distribution throughout frequency domain (white noise). Refer to Motchenbacher and Fitchen "Low Noise Electronic Design" ©1973 John Wiley & Sons, Inc., New York, N.Y. for further explanation.
Figure 8:
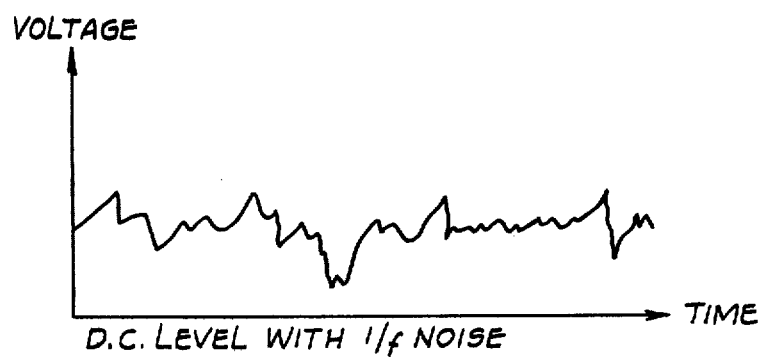
FIG. 8 is a typical D.C. electronic signal with noise having an inverse power distribution with respect to frequency (1/f noise). Refer to Motchenbacher and Fitchen "Low Noise Electronic Design" for further explanation.

Noise which has been impressed on a fast signal risetime such as in FIG. 6, component 41, tends only to modify the rise time and phase of the signal and are not readily visually apparent to the viewer.

While these statements may appear at first glance to be relatively unimportant, careful thought reveals that in the process of noise reduction, it is relatively unimportant to try to correct the noise in fast risetimes, such as FIG. 2, 33, FIG. 6,41. Therefore, noise in high frequency video components is not as important as that in low frequency components.

Figure 4:
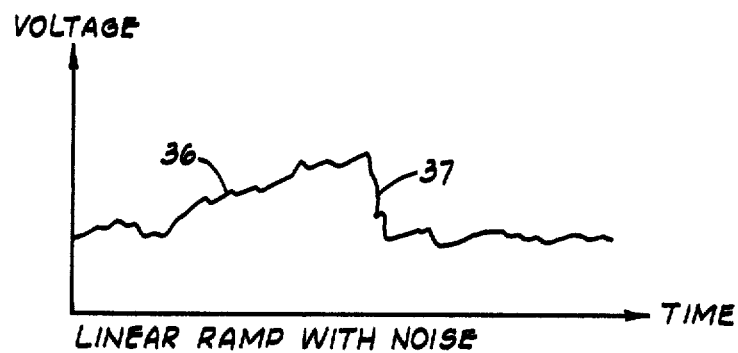
FIG. 4 is a typical electronic linear ramp signal 36 with detail 37 as in FIG. 3 after noise has been impressed on said signal and detail.
Figure 5:
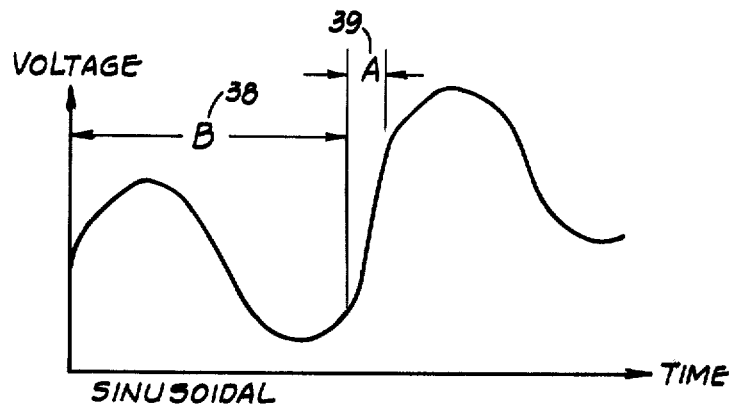
FIG. 5 is a typical sinusoidal electronic signal 38 with detail 39.

Noise in the slow risetime components such as in FIG. 4, item 36, tend to modify the amplitude of the signal causing readily apparent visual annoyance, therefore, this noise should be of prime concern to a designer who is involved in reducing visual noise effects. Since color information is both phase and amplitude encoded in an NTSC system, phase variations of the color subcarrier are also of concern. With an averaging technique this would be corrected.

THEORY OF NOISE REDUCTION

First, a plan for noise reduction of steady state D.C. and linear ramps is disclosed. Processing such as, but not limited to, averaging and bandwidth limiting to a low frequency for these waveforms will give a proportional decrease in white noise and a restricted decrease in excess, 1/f and other types of noise for these signals. The amount of reduction can be rather dramatic since virtually all of the noise can be limited if the upper frequency of the bandwidth is severely limited. In video, any noise below 15kh$_z$ would appear as a line to line brightness change and any noise above 15kh$_z$ would be eliminated with sufficient processing. Obviously, with flat 15kh$_z$ filtering, there would be no signal data or information passed, so it is necessary to determine when high frequency signal information is present and remove, restrict, or turn off the processing during the time this information is present. As discussed previously, noise has a small visual effect on high frequency signal information, so that restricting the processing during this time to preserve the high frequency signal will have little visual effect on this portion of the signal. A graphic example of the above is given in FIGS. 9, 9A, 9B.

In order to process the video waveform, it is easiest to first convert the analog waveform to a digital representative of the waveform. This will make it easier to perform the mathematical averaging function. The conversion equipment, (See FIGS. 10 and 11), known as an analog to digital converter or A-D is commercially available and will not be discussed extensively. A representative input waveform to the A-D with a linear ramp 43 (FIG. 10) and a sinusoidal waveform 44 is shown. The A-D samples, 45–50, occur on the waveform at a frequency which is exactly 3 times the frequency of the color subcarrier. The output of the A-D is a series of 8 bit binary data words (FIG. 10, items 51–56) which occur at a rate which is exactly 3 times (3×) the color subcarrier frequency of the NTSC video signal. The individual data word is a binary number whose magnitude is directly related to the magnitude (voltage) of the incoming video waveform which it represents. In addition to these 8 bits of data, (FIG. 11, items 59–66), there is also available a square wave clock pulse (FIG. 11,67) whose negative to positive transition corresponds to the time when the 8 data bits may be stored or transferred with the assurance that they are valid and stable. This clock is provided because between sample points there is a period of uncertainty when the data is changing. There will be one clock pulse for each data word. A-D conversion techniques are by no means limited to 8 bits or 3× subcarrier nor is processing limited to NTSC video signals. Arithmetic operations such as addition which change the binary data, will change the analog waveform correspondingly, when the binary data is converted back to analog, in a digital to analog converter (D-A) FIG. 11, 68. For example, if all the data words are multiplied by 2, the analog output will be doubled. In order to utilize the digital domain to do the noise reduction, the actual digital circuitry to perform the arithmetic functions, such as comparing and averaging, is inserted in the binary data line between the A-D and D-A as in FIG. 12. The continual stream of 8 bit data words from the A-D is fed via a transmission line 72 to the noise unit 73 where the noise unit stores, compares and processes the data, then the data which has been processed is fed via a transmission line 74 to the D-A 75 where the digital data is converted back to analog data and applied to the output 76. A further discussion and detailed description of analog to digital and digital to analog conversion may be found by referring to U.S. Pat. No. 3,860,952. This patent covers the Consolidated Video Corp. Model No. 504A. Digital Time-base Corrector, utilizes the A-D to D-A process to facilitate time-base correction of a video signal. The A-D converter of this device was utilized to implement the invention herein disclosed.

THEORY OF OPERATION FOR COLOR PHOTOTYPE

In order to process color properly in the NTSC system, care must be taken to ensure that comparisons and computations are made only on samples of successive corresponding parts of the color subcarrier waveform (S.C.). Refer to FIG. 14 where a sine wave subcarrier is shown with A-D sample spots (S0-S8)82–90 indicated occurring at a 3 time S.C. rate. If comparisons are made between successive samples or data bits S0, S1, S2, etc., the difference in the value of these bits would be affected by both noise on the signal and the normal displacement due to the sinusoidal waveform. Obviously, it would be difficult to compute the amount of noise present by first correcting the bits to remove, or compensate for, the amount of color subcarrier present. Now consider the case where every bit is compared to the one 3 bits before i.e. S1 and S4, S2 and S5, etc. Clearly, in a steady signal, these bits will differ only by the noise difference between the two bits being compared. It is possible to average these samples to determine the average value of the samples and correct these subcarrier samples accordingly to remove the variation. Refer to FIGS. 15, 16 and FIG. 24 (FIGS. 15 and 16 are block diagrams of FIG. 24).

In order to analyze the operation of the noise reduction circuitry first assume that data word 1 (D1) (Refer specifically to FIG. 15) which corresponds to sample 1 (S1) is present at the input register when the first clock pulse arrives. Data word 1 (D1) will be transferred to the inputs of register A, 101 and ALU1, 100. The input register 94 is not necessary to the operation of the unit but does serve to minimize reflections on interconnecting lines. In a similar manner, at the next clock pulse, data word 1 will pass through Register B, 102, and with successive clock pulses, will pass through Register E, 103 and Register D, 104 and it will then appear at the input of ALU-3,105. In a similar manner, data words 2, 3, and 4 will also propagate through this string. Registers A, B, E, and D make up the delay block of the circuit. Now consider the time period just after clock pulse 4 when we have the situation shown in FIG. 16. We earlier assumed the output of register 94, point 108 is applied to the input of ALU-1,100, ALU-1 performs a subtraction function, subtracting Data Word 1 from Data Word 4. An output of ALU-1, point 109 gives the result of the subtraction and a second output from ALU-1 indicates whether the answer is positive or negative. This information is stored in Register C, 99 at the next clock pulse. We may assume that Register C already has stored the difference of the previous subtraction which was D3-DO. We may also assume that Register D has Data DO already stored. ALU-3,105 averages DO with the difference of D3 and DO from Register C according to the formula $X = DO \pm (D3 - DO)/2$. The previously stored sign (+ or −) information for the quanity (D3 − DO) is used by the ALU-3 in order to perform the plus or minus function so that if D3 is greater than DO, (D3−DO)/2 is added to DO and if D3 is smaller, (D3−DO)/2 is subtracted from DO. Since the difference between D3 and DO is the low frequency noise impressed on the waveform, the output of ALU-3 will be DO with ½ of the noise removed by this averaging process. This noise averaging process will continue indefinitely, processing every bit of information in the waveform. Now assume the case where the subcarrier has a long term D.C. shift in either a positive or negative direction. Since the difference in data is only corrected by a factor of 0.50, 3 clock pulses after the shift appeared at input point 108, the shift will appear at the output of ALU-3, 116, offset by ½ of the D.C. shift over the 3 clock period, but having the same slope as the input. For most applications, this shift is not noticeable to a viewer watching a picture monitor; if it were, further circuitry could compensate for it. Next assume the case where there is a step function or a large D.C. shift in the input waveform. This is where ALU-2,97 and the switch 106 come into operation. As soon as the new level and old level are subtracted by ALU-1, and subsequently clocked through Register C, the difference at point 114 is presented to the input of ALU-2. ALU-2 compares this difference to a fixed number X,96 which is set by a series of switches. If this difference is greater than the number X (detail threshold) ALU-2 sends a signal via point 115 to the switch, which switches it from the averaged output of ALU-3 to the uncorrected output of Register D. This effectively bypasses the processing action for the duration of the large level shift and preserves the detail of the risetime. The delay 98 between ALU-2 and the switch passes a switch off command instantly and delays the following switch on command for 3 clock pulses. This allows the detail to clock through the Register chain 101-104 to the output. ALU-1, REG C, ALU-2, X, the 3 CLK hold and their associated component make up the comparison block of the circuit. ALU-3 and the SPDT switch make up the processing block of the circuit. The output register 95 is not necessary to the operations but was included in order to minimize transmission line reflections in the prototype. The net effect of these three actions is that the noise on color subcarrier will be reduced by a factor of ½ for both steady state subcarrier and for slowly shifting color subcarrier, this will give an improvement of the signal in these areas. Those areas which are of fast risetime or high detail are bypassed. This preserves the detail, but no noise limiting will take place. Since noise is not as noticeable on these high detail areas, there would be little visual improvement of the signal anyway.

The overall effect of the processing, as viewed on the picture monitor will be that of a much more pleasing image which still has its original detail but has lost much of the objectionable graininess. The foregoing circuit was designed primarily to demonstrate the principle of noise reduction of an electronic signal. With a little study one sees that by adding more delay to increase the time between compared pulses to a single or one horizontal line, the net effect is to compare successive vertical picture elements. Also, it would be advantageous to compare several different adjacent picture elements so that comparisons could be made in a plane and make the bandwidth limiting and averaging more exacting. These methods would, of course, require much more circuitry to implement but can be accomplished under the teachings of the present invention.

The above analysis may be expanded to include processing of a television video signal. It will be seen that the comparison of adjacent picture elements, as described above, will be most useful. Referring to FIG. 25, one sees a representation of five scan lines which may be taken from any point in the television raster, as viewed on a television CRT. The scan lines are adjacent in location on the CRT but will not necessarily be sequential in time, depending on the type of television system used.

The lines in FIG. 25 are broken into segments A through H, A', B', C', F', G', H', and X which represent picture elements and may be equated to the digital samples which were previously discussed. By envisioning the picture elements of FIG. 25 as being segments or pixels of an actual display of a television scene, one may understand that elements D and E will be very similar to element X. The video waveforms which correspond to these scan lines might look like those in FIG. 26 where pixel A corresponds to voltage a, A' to a', etc. As previously discussed, in a noisy signal, by averaging pixels D and X a better approximation of the true noise free value of the waveform in the area around pixel X is obtained. Statistically, it can be shown that the greater the number of pixels which are compared to pixel X, and used to determine a new approximated value for the true value of pixel X before noise was added, the better that approximation will be.

This process of approximating or predicting the true value for a series of pixels, which have noise impressed on them, is called noise reduction. In a simple low cost form the circuitry used to accomplish noise reduction would compare pixel X to pixel D or E and if these pixels were approximately the same, the two would be averaged, giving a new value for pixel X. If the pixels were very different, no average would take place. The next pixel would then undergo the same process thus making the system continuous. This is the theory of operation of the device which has been previously described. An imporvement to this system would be to weight the averaging so that as the pixels get farther and farther apart in magnitude, the comparison pixel (D) would affect the prediction less and less. A formula which would accomplish this is $(1-Z) \times D + Z \times X$ where Z is the weighting factor and $Z = 0.5$ for $D = X$ and increases as the magnitude of D−X increases until Z=1 where D=−X.

Another logical improvement on this system is to use several adjacent pixels with each pixel being compared to X and then averaged with X according to some weighted averaging process. Of course, instead of an actual sum and divide type of average the hardware would operate more efficiently if a prediction of the amount of noise on pixel X were computed by inspecting the adjacent pixels with respect to pixel X, and this amount of noise subtracted from pixel X.

In the actual hardware implementation of a scheme where several adjacent pixels are compared to an input pixel, there are many considerations to be made. Referring again to FIG. 25 and assuming a NTSC system, those pixels which are truly adjacent to pixel X are A', B', C', D, E, F', G' and H'. Since pixels D and E are very close to pixel X in time, there is a good probability that any low frequency noise on pixel X will also be spread over pixels D and E. An average of pixels D and E to provide a reference for determining an estimate of the true value of X will be of limited use for low frequency noise. Pixels A', B', C', F', G' and H' are physically adjacent to X but in time are quite separate from X and therefore both low frequency and high frequency noise impressed on these adjacent pixels would be very random with respect to X. One may assume that pixels A', B' and C' may however contain different amounts of high frequency picture information or detail, so it would be wise to select only the one of the three that is closest in magnitude to X or to average all 3 of these pixels to remove or reduce this high frequency detail before computing a reference. A similar technique may be used for pixels F', G' and H', to provide another reference for comparison to pixel X.

In the NTSC system, in order to have the adjacent pixels A', B', C', F', G', and H' available for comparison at the same time as pixel X, a large delay or memory of approximately 1 field must be used. Large delays, with current techniques, are very costly. In order to reduce this cost, it would be possible to use pixels A, B, C, F, G, and H, which are taken from the same field as X, in place of those truly adjacent pixels which would come from the previous field. These pixels from the same field would still be relatively similar to pixel X and would have random noise impressed on them. A very good cost/performance tradeoff can be expected by using pixels which are not adjacent to the input pixel X, but are close to it, such as those pixels to the left and right of pixels D and E respectively.

In the previous discussion, no mention has been made of the order of processing the various pixels with respect to time. One variation of note relates to pixels which happened in time before the pixel which is currently being input to the system. Referring to FIG. 25, in the NTSC system, pixels A, B, C, and D as well as A', B', C', F', G', and H' would have happened before input pixel X, if one assumes pixel X is in the second field. It should be obvious that it would be quite easy to derive a recursive type of system so that those pixels which are used for a reference for estimating the true value of X have also been previously processed in order to remove part of the noise from them. This process would be easily accomplished by delaying the output of the device and using the output of the delay as the reference for the comparison to the input. Referring to FIG. 13, and assuming connection NRI is deleted and RI is connected to form a recursive system, the comparison block will now compare the delayed output signal to the input signal. The delay d output signal is a noise reduced version of the input signal which allows the input picture element to be compared to a noise reduced picture element which was previously input to the system. For example, in FIG. 25, any of the pixels A, B, C, D, A', B', C', F', G', or H' can be compared to pixel X with these pixels having been previously noise reduced, if it is assumed that pixel X is in the second field. It should be noted that in actual practice the signal delays through the processing means will contribute to the delay time between the two inputs to the comparison means, thus this delay must be subtracted from the delay means. This and other changes necessary to convert the noise reduction system from a nonrecursive to a recursive system are very similar to classic textbook treatment of digital filters. The processing means is so constructed that whenever the difference between the input signal and the delayed output signal is below a given threshold it provides an average of the input and delayed output signals. Otherwise it provides the equivalent of the input signal.

The principle of comparing two or more points on an electronic signal and mathematically processing the signal to remove the random noise on that signal is by no means limited to the field of television. Any electronic signal which has information of a periodic or predictable nature can be processed in this manner by selecting the delays such that signal elements having some predictable relationship can be compared to determine how well these elements fit their predicted value. For example, Radar signal elements which correspond to the same area of the display CRT on different sweeps could be compared. In the audio domain, most wanted audio is composed of repetitive bursts of frequencies. For any given frequency in the audio spectrum, a wanted piece of information will contain several cycles of this frequency. A random noise at this frequency would be composed of a very few cycles or less than one cycle. By comparing the signal to a point or several points which are integral cycle lengths apart at the frequency being processed, a prediction can be made as to how much noise a given cycle of information has on it. The number of other intelligent signals to which variations of this technique can be applied to are almost endless.

Actual electronic circuitry to accomplish these functions is shown in FIG. 24. This circuitry is typical of state of the art digital electronics and utilizes large scale integration components which are standard manufactured parts. A short functional explanation for each of these components is included in FIGS. 17-23. Manufacturers data sheets may be consulted for further information. It will be seen that the circuitry follows very closely the block diagrams given previously and the operational description given for the block diagram FIGS. 15 and 16 is the same as for the circuit of FIG. 24.

Actual circuit construction was made using computer type wire wrap techniques; however, printed circuit, hand wiring or any type of construction should work equally as well.

As used previously in these descriptions, the word Noise is meant to mean any unwanted disturbances superimposed upon a useful electronic signal that tends to obscure the information content of said electronic signal. Data shall refer to any signal to which intelligence may be assigned, and Detail shall refer to any element of a data signal which differs significantly from those elements which surround it. NTSC or National Television Standards Committe is at present an inactive organization which previously set up the television system currently in use in the U.S.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for reducing noise on an input electronic signal, including in combination, delay means for delaying said input electronic signal to produce a delayed input signal, comparison means responsive to said input electronic signal and said delayed input signal which has the same bandwidth as said input electronic signal which comparison means may always determine if the difference between said signals is greater than a reference and processing means responsive to said comparison means and said delayed input signal to generate an output signal which is either an average of said input and delayed signals when said difference is less than said reference or said delayed signal otherwise, as determined by said comparison means.

2. Apparatus as claimed in claim 1 including means to determine the presence of detail in said input electronic signal as part of said comparison means.

3. Apparatus as claimed in claim 1 including means to remove detail in said delayed input signal as part of said comparison means.

4. Apparatus as claimed in claim 1 wherein said processing means operates in response to said comparison means to allow detail in said input electronic signal to be present on said output signal.

5. Apparatus for reducing noise on an input electronic signal which noise has a peak to peak amplitude which is less than the peak to peak amplitude of said input electronic signal, to a level lower than that at the input of said noise reducing apparatus, with said apparatus requiring no special processing of said input electronic signal before noise is added, including in combination delay means for delaying said input electronic signal to provide a delayed input signal, comparison means for comparing said delayed input signal to said input electronic signal to determine the difference thereof and comparing said difference to a reference which may allow the larger of said reference or said difference to always be determined, and processing means responsive to said comparison means and the full amplitude of said delayed input signal to select as the output signal either an average of said input electronic signal and said delayed signal if said difference is less than said reference or said delayed signal otherwise which selection is in response to said comparison means.

6. Apparatus as described in claim 5 whereby said comparison means operates to determine the presence of detail in said input electronic signal.

7. Apparatus as set forth in claim 5 wherein said comparison means includes means to remove detail from said input electronic signal.

8. Apparatus as set forth in claim 5 wherein digital representation of said input electronic signal is utilized.

9. Apparatus as set forth in claim 5 wherein said input electronic signal is a television video signal and said delay means allows said signals input to said comparison means to correspond to different locations on the television raster.

10. Apparatus as set forth in claim 9, including in combination, means for processing color subcarrier of said television signal.

11. Apparatus as set forth in claim 9, including in combination, means for comparing corresponding parts of NTSC video color subcarrier and means responsive to said subcarrier comparison for processing said NTSC color video subcarrier to reduce noise in said television video signal.

12. Apparatus for generating a noise reduced version of an input electronic signal which has been derived by scanning a spatial image, including in combination delay means for delaying the output signal which is output from said apparatus which output signal represents a noise reduced version of the electronic signal previously input to said apparatus, comparison means for comparing at least one element of said input electronic signal to at least one element of said delayed output signal to determine the difference in said input and said delayed output signal elements and to perform a threshold comparison to determine if said difference is greater than a threshold, said elements corresponding to different points on the scanned image, and processing means responsive to said difference and said threshold comparison of said comparison means and at least one element of said output signal which has been delayed to generate said output signal which represents an average of said input electronic signal and said delayed output signal when said difference is less than said threshold and with said output signal being equivalent to said input electronic signal otherwise.

13. Apparatus as set forth in claim 12 wherein said input electronic signal is a television video signal with said input and delayed output elements being picture elements and said delay means utilizes a delay that is less than one television frame and allows said delayed output signal picture element or elements to be adjacent to the picture element of the input electronic signal which is being input to said comparison means where said picture element or picture elements which are from said delayed output signal are derived from the same field as or the field previous to said input electronic signal picture element.

14. Apparatus as set forth in claim 12 wherein said input electronic signal is a television video signal with said input and delayed output elements being picture elements and said delay means utilizes a delay that is greater than one television frame and allows said delayed output signal picture element or elements to be adjacent to the picture element of the input electronic signal which is being input to said comparison means where said picture element or picture elements from said delayed output signal are derived from a field or fields which occurred previous to the field containing said input electronic signal picture element.

15. Apparatus as set forth in claim 13 wherein said delayed output and input elements are substantially close but not adjacent to each other in the television frame.

16. Apparatus as set forth in claim 12 wherein said delayed output and input elements are multiple elements which are selected from a rectangular area within a television frame.

17. Apparatus for removing noise from an input video signal which is a color television video signal, including in combination, delay means for delaying said input video signal to provide a delayed input video signal corresponding to a point on the raster different from said input video signal, comparison means responsive to said delayed input video signal and said input video signal to determine the difference thereof for all signal conditions and comparing said difference to a reference to determine if said difference is less than said reference, and processing means responsive to said comparison means to construct a noise reduced version of said input video signal which version is an average of said input and delayed input video signals if said difference is less than said reference with said processing means responsive to said delayed input video signal and said comparison means to output said delayed input video signal if said difference is not less than said reference.

18. Apparatus as set forth in claim 17 wherein said color television video signal is represented in digital form.

19. Apparatus as set forth in claim 17 including in combination, digital shift registers or digital memories which comprise said delay means.

20. Apparatus as set forth in claim 17 including in combination, digital arithmetic circuitry as part of said comparison means and processing means.

21. Apparatus as set forth in claim 17, including in combination, digital shift registers as part of said delay means, digital logic circuitry as part of said processing means and digital logic circuitry as part of said comparison means.

22. Apparatus as set forth in claim 18, including in combination, digital arithmetic logic means and digital memory means as part of said processing means.

23. Apparatus as set forth in claim 17, including in combination, said processing means utilizing mathematical altering of said delayed input video signal and the difference of said input and said delayed input video signals, with said processing means operating in response to said comparison means, with said comparison means performing comparisons of said input video signal and said delayed input video signal to determine the presence of detail in said input video signal.

24. Apparatus as set forth in claim 17 including said delay means which utilizes a delay of substantially one television pixel, or one television horizontal line or one television field or a combination of pixels, lines, or fields to enable said comparison means to compare at least one pixel of said delayed input video signal to at least one pixel of said input video signal with said pixels being adjacent to each other as viewed on a television screen.

25. Apparatus as set forth in claim 24 including said processing means having binary mathematical formulas to modify said input video signal.

26. Apparatus as set forth in claim 25 whereby said formulas may be changed to suit the amount of noise of said input video signal.

27. Apparatus as set forth in claim 26 whereby said formulas operate relative to constants which may be changed to suit said input video signal.

28. The method of removing noise on an input color television signal including the steps of delaying said input video signal to provide a delayed input video signal corresponding to a point in the raster different from said input video signal, comparing the delayed input video signal to the input video signal in its undelayed condition to determine the difference thereof under all signal conditions and to compare said difference to a reference to determine the larger thereof and processing the delayed input video signal and said difference in direct response to the aforementioned comparison to said reference to produce an output signal which is either an average of said input and delayed input video signal when said difference is less than said reference, or is equal to said input video signal.

29. The method of generating a noise reduced version of an input electronic signal including the steps of delaying said input electronic signal to produce a delayed input signal having the same bandwidth as said input electronic signal, comparing said input electronic signal to said delayed input signal to determine the difference thereof and comparing said difference to a reference which may allow the larger of said difference or said reference to always be determined, and processing said delayed input signal in response to said comparisons to generate a signal which may be changed from an average of said input and delayed input electronic signals to a signal equivalent to said input electronic signal in response to said comparisons.

30. The method of generating an output electronic signal which is a noise reduced version of an input electronic signal which has been derived by scanning a spatial image, including the steps of delaying said output electronic signal, comparing at least one element of said delayed output electronic signal to at least one element of said input electronic signal to determine the difference to said elements and comparing said difference to a reference to determine the larger thereof, said elements corresponding to different points on the scanned image, and processing said delayed output electronic signal with said difference in direct response to the aforementioned comparison of said difference and said reference to generate said output signal which is an average of said delayed output and input electronic signals when said difference is less than said reference or is equivalent to said input signal otherwise.

* * * * *

REEXAMINATION CERTIFICATE (400th)

United States Patent [19]

Cooper

[11] B1 4,305,091

[45] Certificate Issued  Oct. 8, 1985

[54] ELECTRONIC NOISE REDUCING APPARATUS AND METHOD

[76] Inventor: J. Carl Cooper, 1101 Continentals Way #109, Belmont, Calif. 94002

Reexamination Reqs:st:
No. 90/000,504, Feb. 15, 1984
No. 90/000,674, Dec. 3, 1984

Reexamination Certificate for:
Patent No.: 4,305,091
Issued: Dec. 8, 1981
Appl. No.: 30,288
Filed: Apr. 16, 1979

Related U.S. Application Data

[63] Continuation-in-part of Ser. No. 763,904, Jan. 31, 1977, abandoned.

[51] Int. Cl.³ ............... H04N 9/535; H04N 5/21; H04B 15/00
[52] U.S. Cl. ............................. 358/36; 358/167; 328/165

[56] References Cited

U.S. PATENT DOCUMENTS

| | | | |
|---|---|---|---|
| 3,434,987 | 1/1969 | Fluhr | 328/127 |
| 4,050,084 | 9/1977 | Rossi | 358/31 |
| 4,107,736 | 8/1978 | Lowry et al. | 358/36 |

FOREIGN PATENT DOCUMENTS 2236334  7/1972  Fed. Rep. of Germany .

OTHER PUBLICATIONS

R. H. McMann, et al., "A Digital Noise Reducer for Encoded NTSC Signals", Reprinted from Digital Video, Jan., 1977, pp. 99–103.
Arthur Kaiser, "Comb Filter Improvement with Spurious Chroma Deletion", *Journal of the SMPTE*, vol. 86, Jan., 1977, pp. 1–5.
Murray J. Stateman and Murray B. Ritterman, "Theoretical Improvement in Signal to Noise Ratio of Television Signals by Equivalent Comb Filter Technique", Sylvania Electric Products, Inc., pp. 13–17.
John P. Rossi, "Digital Television Image Enhancement", *Journal of the SMPTE*, vol. 84, Jul., 1975, pp. 545–551.
R. H. McMann, Jr., "Improved Signal Processing Techniques for Color Television Broadcasting", *Journal of the SMPTE*, vol. 77, Mar., 1968, pp. 221–228.
Warren D. White and A. E. Rivin, "Recent Advances in the Synthesis of Comb Filters" Airborne Instruments Laboratory, Inc., pp. 186–199.
"Digital Techniques for Reducing Television Noise", Rossi, *Journal of the SMPTE*, Mar., 1978, vol. 87, No. 3.

*Primary Examiner*—Michael A. Masinick

[57] ABSTRACT

The present disclosure teaches a method and apparatus for reducing noise in an electronic signal. These inventive conceptions include a means for delaying the electronic signal and a comparison means for comparing the delayed signal to the signal in its undelayed condition. Means are provided for processing the signal in response to the comparison means to reprove at least a part of the noise.

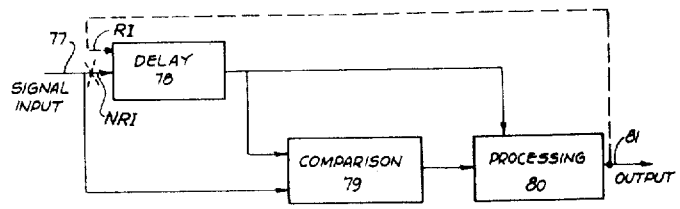

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-30 is confirmed.

* * * * *

REEXAMINATION CERTIFICATE (3438th)
United States Patent [19]
Cooper

[11] B2 4,305,091
[45] Certificate Issued Feb. 10, 1998

[54] ELECTRONICS NOISE REDUCING APPARATUS AND METHOD

[76] Inventor: J. Carl Cooper, 1101 Continentals Way #109, Belmont, Calif. 94002

Reexamination Request:
No. 90/002,107, Aug. 13, 1990

Reexamination Certificate for:
Patent No.: 4,305,091
Issued: Dec. 8, 1981
Appl. No.: 30,288
Filed: Apr. 16, 1979

Reexamination Certificate B1 4,305,091 issued Oct. 8, 1985

Related U.S. Application Data

[63] Continuation-in-part of Ser. No. 763,904, Jan. 31, 1977, abandoned.

[51] Int. Cl.[6] ................. H04N 5/21; H04N 9/00
[52] U.S. Cl. ............ 348/619; 327/552; 348/607

[56] References Cited

U.S. PATENT DOCUMENTS

| | | | |
|---|---|---|---|
| 3,009,016 | 11/1961 | Graham | 358/167 |
| 3,978,409 | 8/1976 | Dolby et al. | 358/36 |
| 4,050,084 | 9/1977 | Rossi | 358/31 |
| 4,058,836 | 11/1977 | Drewery | 358/167 |
| 4,064,530 | 12/1977 | Kaiser | 358/36 |
| 4,090,221 | 5/1978 | Connor | 358/167 |
| 4,388,729 | 6/1983 | Spencer et al. | 358/36 |

FOREIGN PATENT DOCUMENTS

| | | |
|---|---|---|
| 1271161 | 6/1968 | Germany . |
| 1287114 | 1/1969 | Germany . |
| 2413799 | 10/1974 | Germany . |

OTHER PUBLICATIONS

Digital Processing Of Screen Image—Hitachi Seisakusho K.K. Central Lab. K. Fukinuke NHK, General Technical Lab. Junichi Ishida (The Journal Of The Institute Of Television Engineers of Japan), Oct., 1976.

Digital Techniques For Reducing Television Noise by John P. Rossi (SMPTE) Journal), Mar. 1978 vol. 87.

What Is Signal Averaging? (Hewlett Packard Journal), Apr., 1968.

*Primary Examiner*—Donald Hajec

[57] ABSTRACT

The present disclosure teaches a method and apparatus for reducing noise in an electronic signal. These inventive conceptions include a means for delaying the electronic signal and a comparison means for comparing the delayed signal to the signal in its undelayed condition. Means are provided for processing the signal in response to the comparison means to remove at least part of the noise.

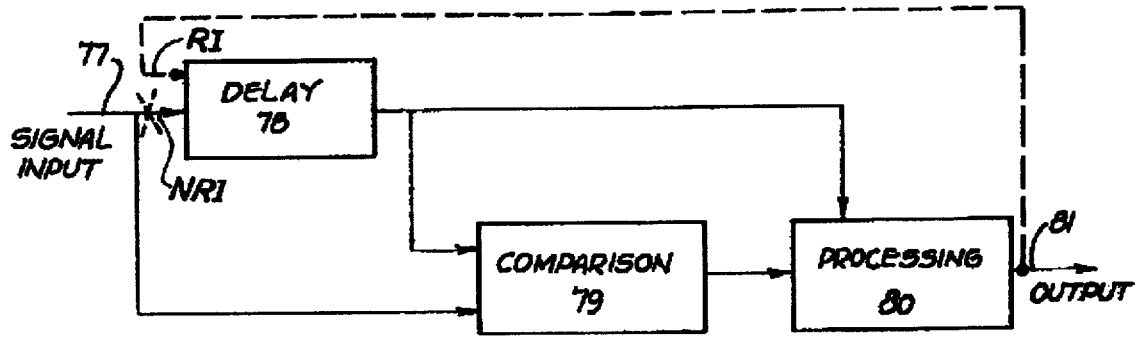

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3, 6, 7, 10–16, 23, 25–28 and 30 is confirmed.

Claims 1, 4, 5, 8, 9, 17–22, 24 and 29 are cancelled.

New claims 31–39 are added and determined to be patentable.

*31. The method as claimed in claim 28, 29, or 30 wherein said difference is combined with said delayed signal to generate said equivalent to said input video signal when said difference is greater than said reference.*

*32. The method as claimed in claim 28, 29, or 30 wherein a portion of said difference is combined with said delayed signal to generate said average when said difference is less than said reference.*

*33. The method as claimed in claim 28, 30, or 39 wherein said comparison of delayed and undelayed signals involves adjacent elements.*

*34. The method as claimed in claim 28, 30, or 39 wherein said comparison of delayed and undelayed signals involves non-adjacent but close elements.*

*35. The method as claimed in claim 28, 30, or 39 wherein said comparison of delayed and undelayed signals involves points which are integral cycle lengths apart.*

*36. The method as claimed in claim 28, 29, or 30 wherein said delayed signal has been previously noise reduced.*

*37. The method as claimed in claim 28, 29, or 30 wherein said delayed video signal has been previously compared before said delaying.*

*38. The method as claimed in claim 28, 29, or 30 wherein said average is an average wherein the weighting thereof is responsive to said difference.*

*39. The method of generating a noise reduced version of an input electronic color television signal including the steps of delaying said input electronic video signal to produce a delayed input video signal having the same bandwidth as said input electronic video signal and corresponding to a point in the raster different from said input electronic video signal, comparing said input electronic video signal in its undelayed condition to said delayed input video signal to determine the difference thereof under all signal conditions and comparing said difference to a reference to allow the larger of said difference or said reference to always be determined, and processing said delayed input video signal and said difference in direct response to said comparisons to said reference to generate an output signal which is either an average of said input and delayed input electronic video signals when said difference is less than said reference, or is a signal equal to said input electronic video signal in response to said comparisons.*

* * * * *